(12) United States Patent
Chinni et al.

(10) Patent No.: US 12,450,352 B2
(45) Date of Patent: Oct. 21, 2025

(54) SUPPORTING NON-SNAPPABLE DATA SOURCES

(71) Applicant: Rubrik, Inc., Palo Alto, CA (US)

(72) Inventors: Manjunath Chinni, Saratoga, CA (US); Sai Kiran Katuri, Santa Clara, CA (US); Swapnil Bawaskar, Seattle, WA (US); Manjunatha Devegowda, San Jose, CA (US); James Irvin, Palo Alto, CA (US); Van Hoang Thuy Nguyen, Danville, CA (US); Kamna Jain, Portland, OR (US)

(73) Assignee: Rubrik, Inc., Palo Alto, CA (US)

( * ) Notice: Subject to any disclaimer, the term of this patent is extended or adjusted under 35 U.S.C. 154(b) by 101 days.

(21) Appl. No.: 18/419,457

(22) Filed: Jan. 22, 2024

(65) Prior Publication Data

US 2024/0248991 A1  Jul. 25, 2024

Related U.S. Application Data

(60) Provisional application No. 63/441,064, filed on Jan. 25, 2023.

(51) Int. Cl.
*G06F 21/00* (2013.01)
*G06F 21/55* (2013.01)
*G06F 21/56* (2013.01)

(52) U.S. Cl.
CPC .......... *G06F 21/568* (2013.01); *G06F 21/552* (2013.01); *G06F 21/564* (2013.01)

(58) Field of Classification Search
CPC ..... G06F 21/568; G06F 21/552; G06F 21/564
See application file for complete search history.

(56) References Cited

U.S. PATENT DOCUMENTS

2016/0246680 A1* 8/2016 Ngo ................... G06F 11/1448
2021/0109814 A1* 4/2021 Dewey ................. G06F 3/067

* cited by examiner

*Primary Examiner* — Ghazal B Shehni
(74) *Attorney, Agent, or Firm* — Holland & Hart LLP

(57) ABSTRACT

Methods, systems, and devices for data management are described. One or more requests to apply data observation to one or more data sources may be received via an interface. Whether snapshots are supported for the one or more data sources may be determined. A first, snapshot-supported data source may be stored at a first data storage as a snapshot and a representation of the second, snapshot-unsupported data source may be stored at a second data storage. First data may be extracted from the snapshot and second data may be extracted from the representation of the second data source such that a first data observation procedure may be applied to the first data and a second data observation procedure may be applied to the second data. Results of the data observation procedures may be reported via an interface.

20 Claims, 8 Drawing Sheets

SUPPORTING NON-SNAPPABLE DATA SOURCES

RELATED APPLICATIONS

The present application claims priority to U.S. Provisional Patent Application No. 63/441,064 filed Jan. 25, 2023, entitled "SUPPORTING NON-SNAPPABLE DATA SOURCES," which is assigned to the assignee hereof and is incorporated by reference herein in its entirety.

FIELD OF TECHNOLOGY

The present disclosure relates generally to data management, including techniques for supporting non-snappable data sources.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

A data management system (DMS) may be configured to provide data protection for a number of data sources based on taking snapshots for the data sources. In some examples, the DMS may support taking snapshots for certain data sources (e.g., physical machines, virtual machines, certain databases, certain cloud environments, etc.) but not other data sources (e.g., nascent cloud environments). The data sources for which the DMS is configured to take snapshots may be referred to as "snappable" data sources. Though the DMS may be configured to support snapshots for additional data sources over time, doing so may take a significant amount of time (e.g., months or years) and engineering effort. The DMS may also be configured to provide data observation services (e.g., data governance services, threat hunting services, malware detection services, or any combination thereof) for data protected by the DMS. In some examples, the data observation services may be closely integrated with the data protection service offered by the DMS—e.g., the data observation services may be configured to interface with snapshot files.

In some examples, the DMS may not provide data protection for data sources for which snapshots are not supported. Thus, as new cloud environments are established, the quantity of data sources that are not eligible for data protection by the DMS may increase. Without snapshot support for the cloud environments, the DMS may similarly not process the data sources using the data observation techniques supported by the DMS. As a result, the DMS may not provide data protection or data observation services for a large quantity of data sources. Thus, techniques and configurations that enable the DMS to provide non-snapshot data protection and data observation services to non-snappable data sources may be desired.

To provide non-snapshot data protection and data observation services to non-snappable data sources, the DMS may be configured with an application that provides a widely-applicable mechanism for obtaining data from non-snappable data sources and with data observation techniques that are applicable to the data obtained from the non-snappable data sources.

Figure 1:
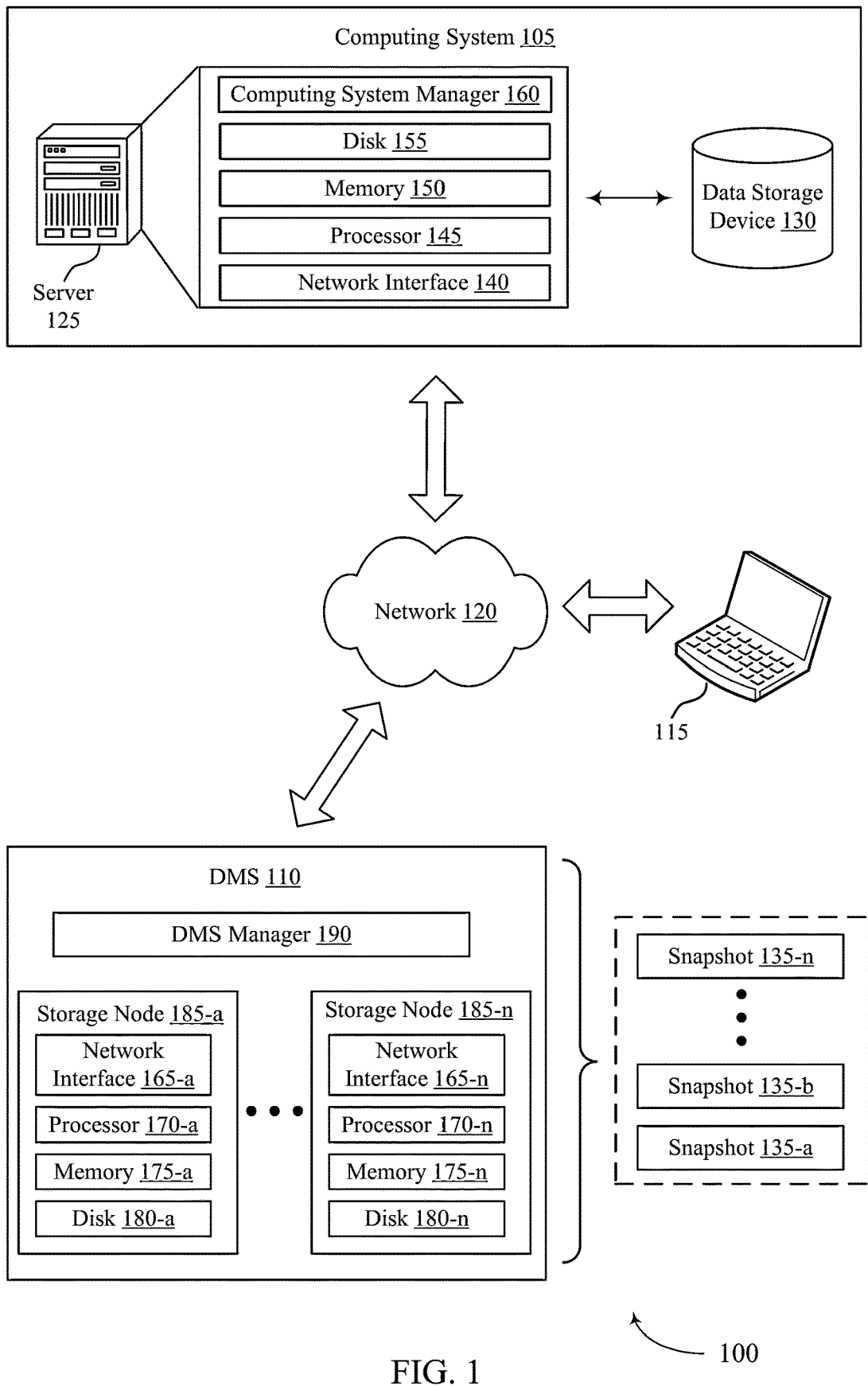
FIG. 1 illustrates an example of a computing environment that supports non-snappable data sources in accordance with aspects of the present disclosure.

FIG. 1 illustrates an example of a computing environment 100 that supports non-snappable data sources in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

As described herein, the DMS 110 may take snapshots of the computing system 105. In some examples, the DMS 110 may take snapshots of portions of the computing system 105 (e.g., certain computing objects, which may also be referred to as data sources) that are "snappable" by the DMS 110. Snappable data sources may be data sources for which a snapshot taking infrastructure has been developed—e.g., virtual machines, file systems, physical machines, databases, etc.

The DMS 110 may be further configured to apply data observation techniques to snapshots taken by the DMS 110. The data observation techniques may include data governance that is used to identify certain types of content within snapshot data—e.g., social security numbers, personal health information, personal identifying information, credit card numbers, file conventions, etc. Threat hunting that is used to identify anomalous behavior between point-in-time snapshot versions, where the anomalous behavior may be indicative of malware activity, a ransomware attack, or the like. And malware detection that is used to detect malware running on a data source for which snapshot-level protection is provided.

In some examples, the DMS 110 may not take snapshots of one or more data sources at the computing system 105—e.g., until snapshot support is built for the one or more unsupported data sources. Thus, the DMS 110 may not provide snapshot-level protection for such unsupported data sources. In some examples, the computing system 105 is a cloud environment that stores data in a way (e.g., using a format or technique) that is not snappable by the DMS 110. In such cases, the DMS 110 may not provide data protection for the data in the computing system 105—e.g., without specific snappable or other data protection support first being built for the computing system 105. Moreover, building snapshot support for the ever-increasing quantity of cloud environments may not be feasible—as building snapshot support for a data source may take months or years. Also, in some examples, the data observation techniques are closely integrated with the snapshot infrastructure such that the data observation techniques are not applicable to non-snapshot data.

Accordingly, the DMS 110 may not provide data protection for certain data sources, and as new cloud environments are established, the quantity of data sources that are not eligible for data protection by the DMS 110 may increase. Without snapshot support for the cloud environments, the DMS 110 may similarly not process the data sources using the data observation techniques supported by the DMS 110. As a result, the DMS 110 may not provide data protection or data observation services for a large quantity of data sources. Thus, techniques and configurations that enable the DMS 110 to provide non-snapshot data protection and data observation services to non-snappable data sources may be desired.

To provide non-snapshot data protection and data observation services to non-snappable data sources, the DMS 110 may be configured with an application that provides a widely-applicable mechanism for obtaining data from non-snappable data sources and with data observation techniques that are applicable to the data obtained from the non-snappable data sources.

In some examples, the DMS 110 may receive, at an interface, one or more requests to apply one or more data observation procedures to a first data source (e.g., a virtual machine) and a second data source (e.g., data stored in a cloud environment). For example, the DMS 110 may receive one request to apply data observation to the first and second data sources. Or the DMS 110 may receive a first request to apply first data observation to the first data source and a second request to apply second data observation to the second data source. In response to the one or more requests, the DMS 110 may determine that snapshots are supported for the first data source (e.g., based on the first data source being included in a list of snapshot-supported data sources) but that snapshots are not supported for the second data source (e.g., based on the second data source being excluded from the list of snapshot-supported data sources). Based on snapshots being supported for the first data source, the DMS 110 may store a representation of the first data source at a first data storage location within the DMS 110 as a snapshot—e.g., one or more the storage nodes 185. That is, the DMS 110 may commence taking one or more snapshots of the first data source. Based on snapshots being unsupported for the second data source, the DMS 110 may initiate a procedure for storing a representation of the second data source at a second data storage location within the DMS 110. For example, a server that supports the operation of a versioned database, such as Azure Blob Storage, where the server may be separate from the storage nodes 185.

Based on storing the representations of the first and second data sources, the DMS 110 may extract first data from the one or more snapshots of the first data source and second data from the representation of the second data source. After extracting the first and second data, the DMS 110 may apply a first data observation procedure to the first data and a second data observation procedure (which may be of a same type as the first data observation procedure) to the second data. The DMS 110 may further report, via the interface, results of the first data observation procedure and the second data observation procedure.

By configuring the DMS 110 to include an application that supports a widely-applicable (e.g., near universal) mechanism (e.g., an open-source data transfer protocol) for obtaining data from all types of data sources, the data observation techniques supported by the DMS 110 may be extended to data stored in non-snappable data sources. Also, by configuring the DMS 110 to include a second storage location for storing data obtained from the non-snappable data sources, data protection services (e.g., non-snapshot level protection) may be extended to the non-snappable data sources. Additionally, by configuring the second storage location with versioning capabilities, point-in-time backup capabilities—as well as a wider set of the data observation techniques (e.g., threat hunting and malware) supported by the DMS 110 that analyze changes in data over time—may be extended to non-snappable data sources.

Figure 2:
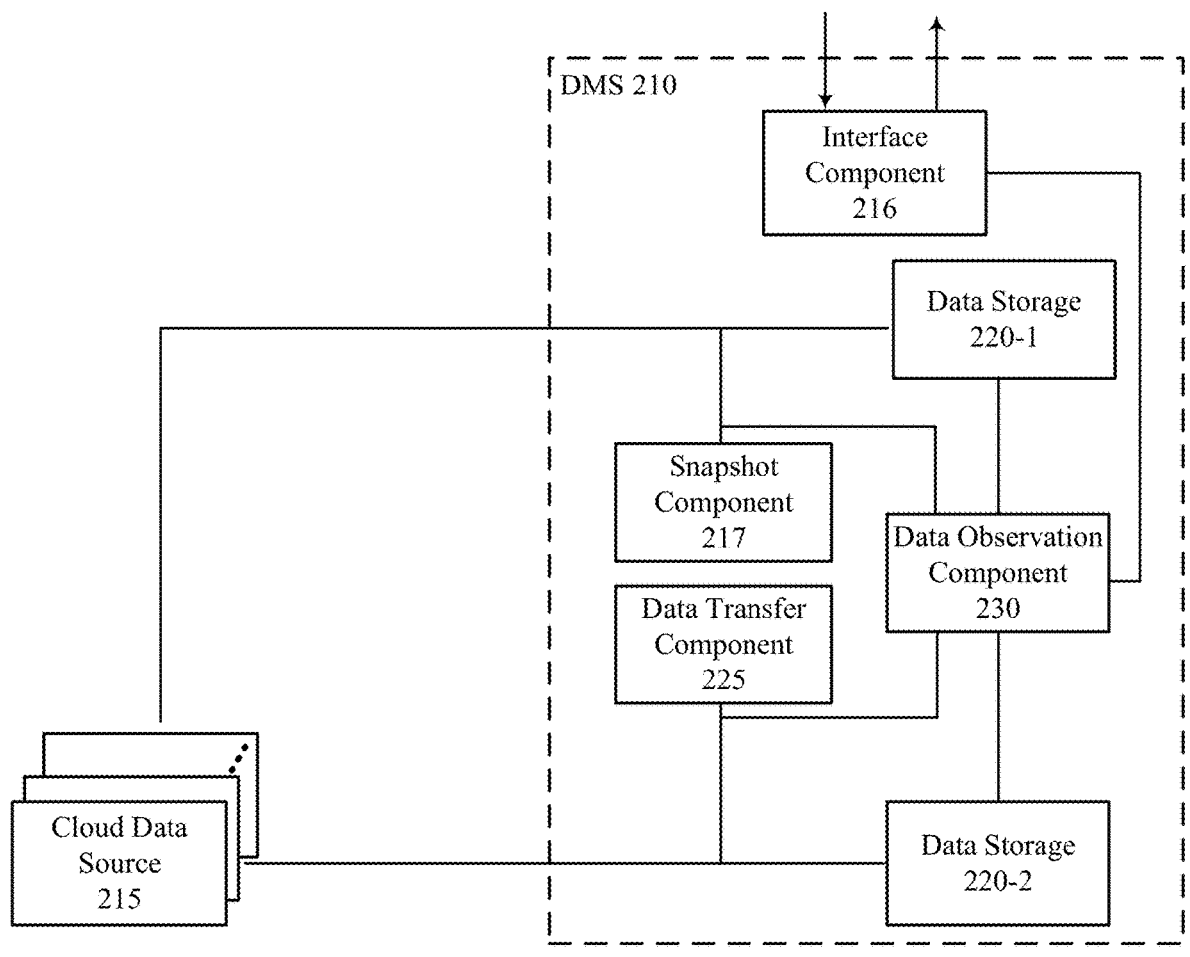
FIG. 2 illustrates an example of a subsystem that supports non-snappable data sources in accordance with aspects of the present disclosure.

FIG. 2 illustrates an example of a subsystem that supports non-snappable data sources in accordance with aspects of the present disclosure.

The subsystem 200 may include the DMS 210 and the one or more data sources (including the cloud data source 215). The DMS 210 may be an example of a DMS described herein (e.g., the DMS 110 of FIG. 1). The DMS 210 may include the interface component 216, the snapshot component 217, the first data storage 220-1, the data transfer component 225, the data observation component 230, and the second data storage 220-2. The data sources may include existing and future cloud data sources (e.g., among hundreds of cloud data sources, including S3, Salesforce, Confluence, Github, Jira, etc.).

The interface component 216 may be configured to provide (e.g., to a customer) a user interface for accessing the services provided by the DMS 110—e.g., a data protection service, a data governance service, a threat hunting service, a malware detection service, etc. In some examples, a customer uses the user interface to request the DMS 110 to provide data protection for a computing system (e.g., a collection of physical machines, virtual machines, databases, etc.) operated by the customer. Additionally, or alternatively the customer may use the user interface to request the DMS 110 process certain data at the computing system using a data observation service supported by the DMS 110. In some examples, the data is stored in a data source that is snappable by the DMS 110. In other examples, the data is stored in a data source that is not snappable by the DMS 110.

The snapshot component 217 may be configured to take snapshots of data sources that are snappable by the DMS 210—e.g., virtual machines, physical machines, databases, etc. The snapshot component 217 may be configured to store snapshots in the first data storage 220-1.

The first data storage 220-1 may be configured to store snapshots for snappable data sources of a customer's computing system. The first data storage 220-1 may be implemented using one or more storage nodes (e.g., the storage nodes 185 of FIG. 1).

The second data storage 220-2 may be configured to store representational data for non-snappable data sources of a customer's computing system. The second data storage 220-2 may be implemented as a versioned storage system (e.g., as an Azure Blob storage or the like). In some examples, the second data storage 220-2 may be implemented using separate equipment than the first data storage 220-1. In other examples, the second data storage 220-2 may be implemented using overlapping equipment with the first data storage 220-1 (e.g., the second data storage 220-2 may be implemented across a second portion of the storage nodes, using one of the storage nodes, etc.

The second data storage 220-2 may be configured to store data for one or more customers. In some examples, as part of storing data for multiple customers, the second data storage 220-2 may be configured to satisfy different SLAs (e.g., a quantity of versions to maintain, a frequency for performing a data observation procedure, etc.) for data stored by different customers.

The data transfer component 225 may be configured to obtain data (which may include content, metadata, or both) from the one or more data sources—e.g., non-snappable data sources (such as the cloud data source 215), snappable data sources, or both. In some examples, the data transfer component 225 is further configured to store the obtained data in the second data storage. In other examples, the data transfer component 225 may be configured to obtain the data for data observation processing without storing the obtained data in the second data storage 220-2. The data transfer component 225 may be programmed with an application that supports obtaining data from a large quantity of data sources in accordance with a standardized data format. In some examples, the data transfer component 225 may implement an open-source data transfer application that provides a standardized mechanism for obtaining data from the data sources, where the open-source data transfer application may be constantly updated to support additional existing and future data sources. In some examples, the data transfer application may support exporting data directly from a cloud data source without the data first being formatted into another format (e.g., SQL).

In some examples, the data transfer component 225 is configured to obtain partial data (e.g., metadata) from the one or more data sources. In such cases, the data transfer component 225 may store the metadata in the second data storage 220-2, and the sensitive underlying data may not be stored at the DMS 210. In some examples, the data transfer component 225 may provide a stream of the metadata to the data observation component 230 without storing the metadata in the second data storage 220-2—e.g., to further protect sensitive data.

In some examples, the data transfer component 225 is further configured to transfer data from the second data storage 220-2 to a data source—e.g., as part of a restoration process. Accordingly, the second data storage 220-2 may be configured to provide backup services for non-snappable data sources.

The data observation component 230 may be configured to analyze data (e.g., content, metadata, or both) stored by the DMS 210 (in either the first data storage 220-1 or the second data storage 220-2) for particular characteristics. For example, the data observation component 230 may be configured to process the stored data for sensitive information (e.g., data of a certain format, such as birth dates, social security numbers, credit card numbers, etc.), naming convention inconsistencies, improper permissions, anomalies that are indicative of malicious activity, malware, etc. The data observation component 230 may be further configured to extract the data from snapshots stored in the first data storage and to extract the data from the data representations stored in the second data storage 220-2. For the data stored in the second data storage 220-2, some data observation processes (e.g., anomaly detection) may be applicable only for versioned data.

In some examples, the data observation component 230 may be configured to process data (e.g., content, metadata, or both) that is streaming from a data source—e.g., without the data being stored in the second data storage 220-2. Processing streaming data may enable data observation services supported by the DMS 110 to be extended to sensitive data that a customer does not wish to store (or is prohibited from storing) in the DMS 110.

Figure 3:
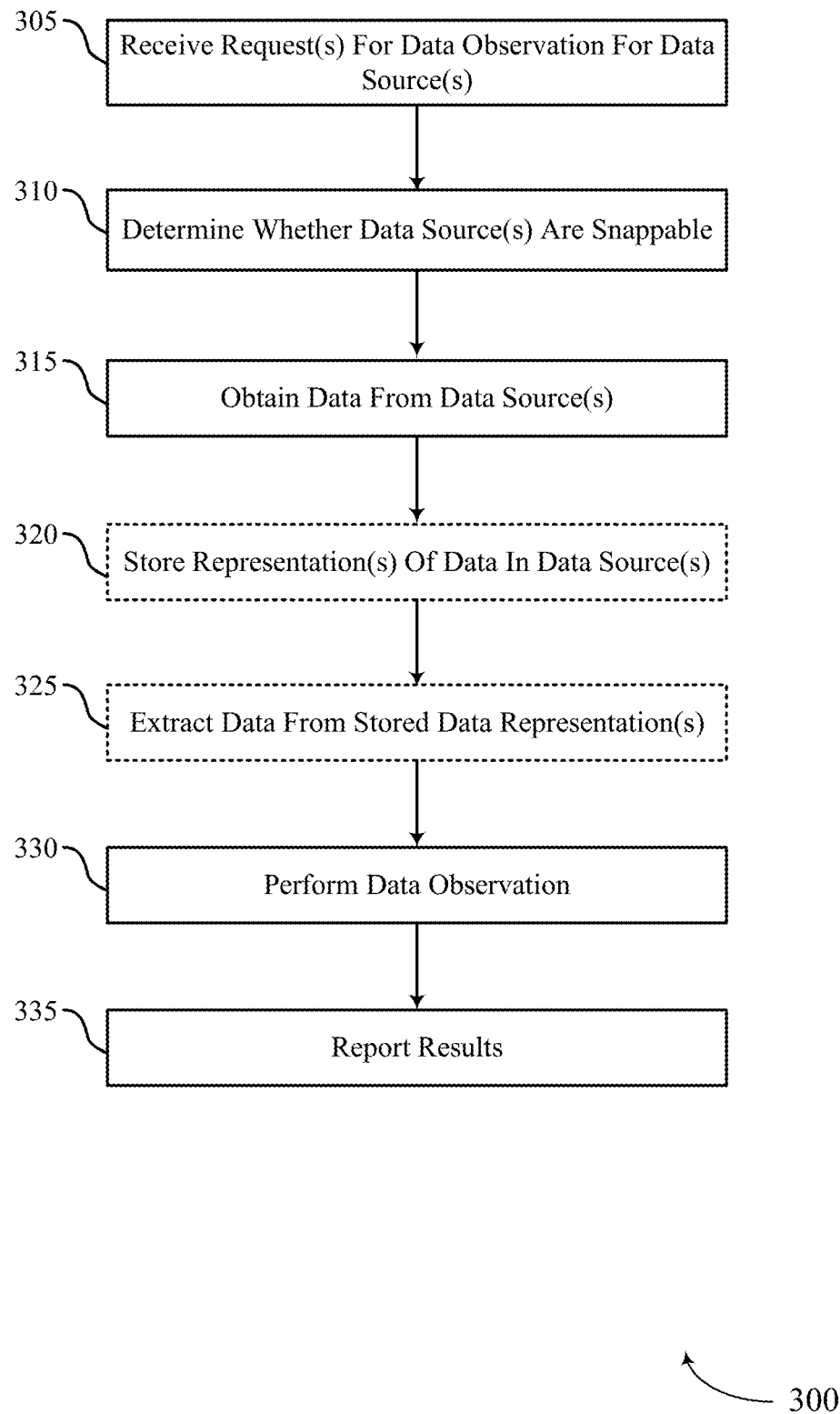
FIG. 3 illustrates an example of a set of operations for supporting non-snappable data sources in accordance with aspects of the present disclosure.

FIG. 3 illustrates an example of a set of operations for supporting non-snappable data sources in accordance with aspects of the present disclosure.

The flowchart 300 may be performed by a DMS described herein—e.g., the DMS 110 or the DMS 210 described with reference to FIGS. 1 and 2. In some examples, the flowchart 300 shows an example set of operations performed to support non-snappable data sources. For example, the flowchart 300 may include operations for obtaining data for both snappable and non-snappable data sources and applying data observation procedures to the data obtained from the snappable and non-snappable data sources.

Aspects of the flowchart 300 may be implemented by a controller, among other components. Additionally, or alternatively, aspects of the flowchart 300 may be implemented as instructions stored in memory (e.g., firmware stored in a memory coupled with a controller). For example, the instructions, when executed by a controller, may cause the controller to perform the operations of the flowchart 300.

One or more of the operations described in the flowchart 300 may be performed earlier or later, omitted, replaced, supplemented, or combined with another operation. Also, additional operations described herein may replace, supplement or be combined with one or more of the operations described in the flowchart 300.

At 305, one or more requests to apply data observation procedures supported by the DMS to one or more data sources may be received—e.g., at an interface component (such as the interface component 216 of FIG. 2). In some examples, one request is received that requests data observation be applied to multiple data sources. In other examples, multiple requests are received that request data observation be applied to respective data sources. By supporting data observation requests (separate from data backup requests), the DMS may offer services that were previously limited to data protected by the DMS (e.g., at a snapshot-level) to data that is not currently protected by the DMS.

At 310, whether the one or more data sources indicated in the request are snappable may be determined (e.g., by the DMS). In some examples, the DMS may determine that a data source is snappable—e.g., by identifying that the data source is included in a list of snapshot-supported data sources. Alternatively, the DMS may determine that the data source is not-snappable—e.g., by identifying that the data source is excluded from a list of snapshot-supported data sources. The DMS may similarly determine if other data sources are snappable or non-snappable.

At 315, data may be obtained from the data sources—e.g., by a snapshot component (such as the snapshot component 217 of FIG. 2), a data transfer component (such as the data transfer component 225 of FIG. 2), or both. The snapshot component may be used to obtain data from the snappable data sources. Obtaining data from the snappable data sources may include receiving data from an agent running on the customer's computing system and using the data to generate snapshots of the snappable data sources. The data transfer component may be used to obtain data from the non-snappable data sources—e.g., cloud data sources that are not (e.g., yet) snappable. Obtaining data from the non-snappable data sources may include gaining access to the cloud data source (e.g., using credentials provided by the customer) and converting the data into a standardized format. In some examples, the data may be obtained directly from the cloud data source without the data first being formatted into another format (e.g., SQL).

In some examples, the data transfer component may be used to obtain data from one or more of the snappable data sources—e.g., if the customer has disabled snapshots taken for a snappable data source. A customer may disable snapshots for a snappable data source for a variety of reasons—e.g., to save costs, if the data in the snappable data source is sensitive, etc. For sensitive data cases, the data transfer component may be used to obtain data from one or more of the snappable data source for processing and without storing the data in the DMS.

In some examples, obtaining the data may include obtaining metadata for the data, the underlying data, or both. In some examples, solely metadata is obtained—e.g., to reduce a storage burden, to avoid exposing sensitive information, etc.

At 320, the data obtained from the data sources may be stored—e.g., by the snapshot component, the data transfer component, or both. The snapshot component may be configured to store the obtained data as snapshots in a first storage location (such as the first data storage 220-1 of FIG. 2. The data transfer component may be used to store representations of the obtained data in a second storage location (such as the second data storage 220-2 of FIG. 2). In some examples, the second storage location may support data versioning and may store representations of different versions of the data sources. In such cases, the data transfer component may be configured to transfer a portion of the data stored in the data sources—e.g., a portion of the data identified as new relative to one or more previous data transfers. Alternatively, the data transfer component may transfer all of the data stored in the data sources, and the second storage location may identify and store a portion of the data identified as new relative to one or more previous data transfers.

As described herein, in some examples, the data obtained from the data sources may not be stored at the DMS but may instead be processed as the data is obtained (e.g., streamed) from the data sources. In some examples, the data obtained from the data sources may be converted into a different format (e.g., a snapshot format if the data source is snappable, or the data transfer format if the data source is not snappable) that is compatible with data extraction techniques at the DMS.

At 325, data may be extracted from the snapshots/representations of the data stored at the storage locations—e.g., by a data observation component (such as the data observation component 230 of FIG. 2). In some examples, the data observation component may use a first set of operations to extract the data from the first storage location and a second, different set of operations to extract the data from the second storage location.

At 330, data observation may be performed for the data sources using the obtained/extracted data (e.g., by the data observation component). As described herein, the data observation component may provide data governance services, threat hunting services, malware detection services, or the like. In some examples, a first data observation procedure may be performed to analyze data from a first data source and a second data observation procedure may be performed to analyze data from a second data source. The first and second data observation procedure may be of a same type (e.g., both threat hunting procedures) or different types.

In some examples, the data observation procedure may be performed solely using metadata stored for a data source—e.g., if only metadata is transferred from the data source. In other examples, the data observation procedure may be performed using the underlying content, metadata for the underlying content, or a combination thereof.

In some examples, findings from a data observation procedure (e.g., a threat hunting observation procedure) performed for different data sources may be combined to make an assessment. For example, data changes observed in a snappable data source may be compared with data changes observed in a non-snappable data source to identify anomalies that are indicative of a malware infection. Similarly, in some examples, a single data observation procedure may be applied to data combined from one or more non-snappable data sources and one or more snappable data sources.

At 335, results of the data observation procedures may be reported (e.g., via the interface component) for the different data sources. In some examples, the results of a data governance procedure may indicate files that include certain types of content (e.g., sensitive content, personal identifying content), files that use inconsistent naming conventions, files with improper permission, etc. The results of a threat hunting procedure may identify anomalies in a data source as well as data paths associated with the anomalies. The results of a malware detection procedure may indicate that a malicious program is running or present on a data source as well as a data path associated with the malicious program.

Figure 4:
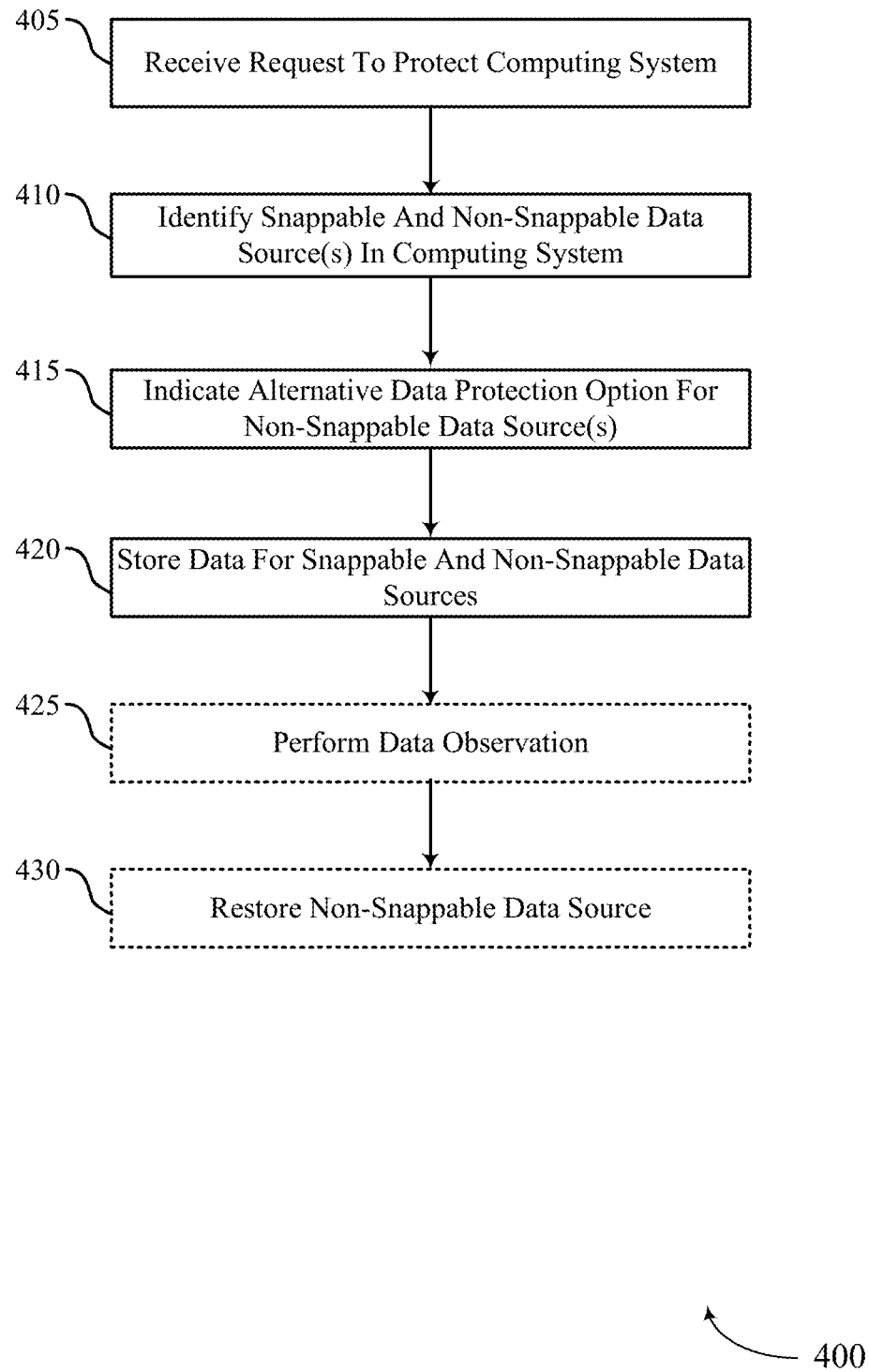
FIG. 4 illustrates an example of a set of operations for supporting non-snappable data sources in accordance with aspects of the present disclosure.

FIG. 4 illustrates an example of a set of operations for supporting non-snappable data sources in accordance with aspects of the present disclosure.

The flowchart 400 may be performed by a DMS described herein—e.g., the DMS 110 or the DMS 210 described with reference to FIGS. 1 and 2. In some examples, the flowchart 400 shows an example set of operations performed to support non-snappable data sources. For example, the flowchart 400 may include operations for protecting data for both snappable and non-snappable data sources.

Aspects of the flowchart 400 may be implemented by a controller, among other components. Additionally, or alternatively, aspects of the flowchart 400 may be implemented as instructions stored in memory (e.g., firmware stored in a memory coupled with a controller). For example, the instructions, when executed by a controller, may cause the controller to perform the operations of the flowchart 400.

One or more of the operations described in the flowchart 400 may be performed earlier or later, omitted, replaced, supplemented, or combined with another operation. Also, additional operations described herein may replace, supplement or be combined with one or more of the operations described in the flowchart 400.

At 405, a request to protect a computing system may be received (e.g., by the DMS). The request may include access to multiple data sources included in the computing system. In some examples, a first set of the data sources may be snappable, while another set of the data source may not be snappable.

At 410, data sources in the computing system that are snappable and data sources in the computing system that are not snappable may be identified (e.g., by the DMS). As described herein, the data sources that are snappable and not snappable may be identified based on consulting a list of snappable data sources and determining whether the data sources in the computing system are included on the list.

At 415, alternative data protection options (e.g., alternative to taking snapshots) may be indicated for the identified non-snappable data sources—e.g., via an interface component (such as the interface component 216 of FIG. 2). For example, the DMS may indicate via the interface component that a versioned storage location may be used to protect the data of the non-snappable data sources. In some examples, before indicating that alternative data protection is available for a non-snappable data source, the DMS may determine whether a data transfer component (e.g., the data transfer component 225 of FIG. 2) supports obtaining data from the non-snappable data source. In such cases, the DMS may indicate that an alternative data protection option is available for a non-snappable data source if the data transfer component supports obtaining data from the non-snappable data source. Otherwise, the DMS may indicate no data protection options are available for the non-snappable data source.

In some examples, indicating the alternative data protection for non-snappable data sources may include providing a customer access to a list of non-snappable data sources for which alternative data protection is supported. In such cases, the customer may navigate through the list of non-snappable data sources and identify data sources that are included in the computing system. Based on identifying a non-snappable data source used by the computing system, the customer may initiate a procedure for establishing an alternative backup procedure for data stored by the customer using the non-snappable data source—e.g., by providing credentials and access information for the data stored in the non-snappable data source.

At 420, data for the snappable data sources may be stored (e.g., by a snapshot component, such as the snapshot component 217 of FIG. 2) in a first storage location (e.g., by a first data storage, such as the first data storage 220-1 of FIG. 2) and data for the non-snappable data sources may be stored (e.g., by the data transfer component) in a second storage location (e.g., by a second data storage, such as the second data storage 220-2 of FIG. 2). The snapshot component may automatically take snapshots of the snappable data sources in response to the request to protect the computing system. The data transfer component may obtain the data from the non-snappable data sources based on receiving a customer request to protect the non-snappable data source using the alternative data protection option. The customer request may include information (e.g., credentials, addresses, etc.) for accessing the data in the non-snappable data sources.

In some examples, the data stored in a snapshot may be analyzed more fully while in a snapshot format than a representation of data stored in a versioned format. For example, a snapshot format may support file level searching without restoration of the data in the snapshot.

At 425, data observation procedures may be performed for the data stored in the first and second storage locations—e.g., as described herein including with reference to the operations described at 330 of FIG. 3.

At 430, data for the non-snappable data sources may be restored (e.g., using the second data storage and the data transfer component) to the non-snappable data sources. If the second data storage provides a versioned storage option, then the data sources may be restorable to a particular point-in-time. In some examples, an indication of one or more points-in-time that are available for restoring a non-snappable data source may be indicated (e.g., via the interface component) to a customer. In such cases, the data transfer component may restore the non-snappable data source to the a point-in-time selected by the customer.

Figure 5:
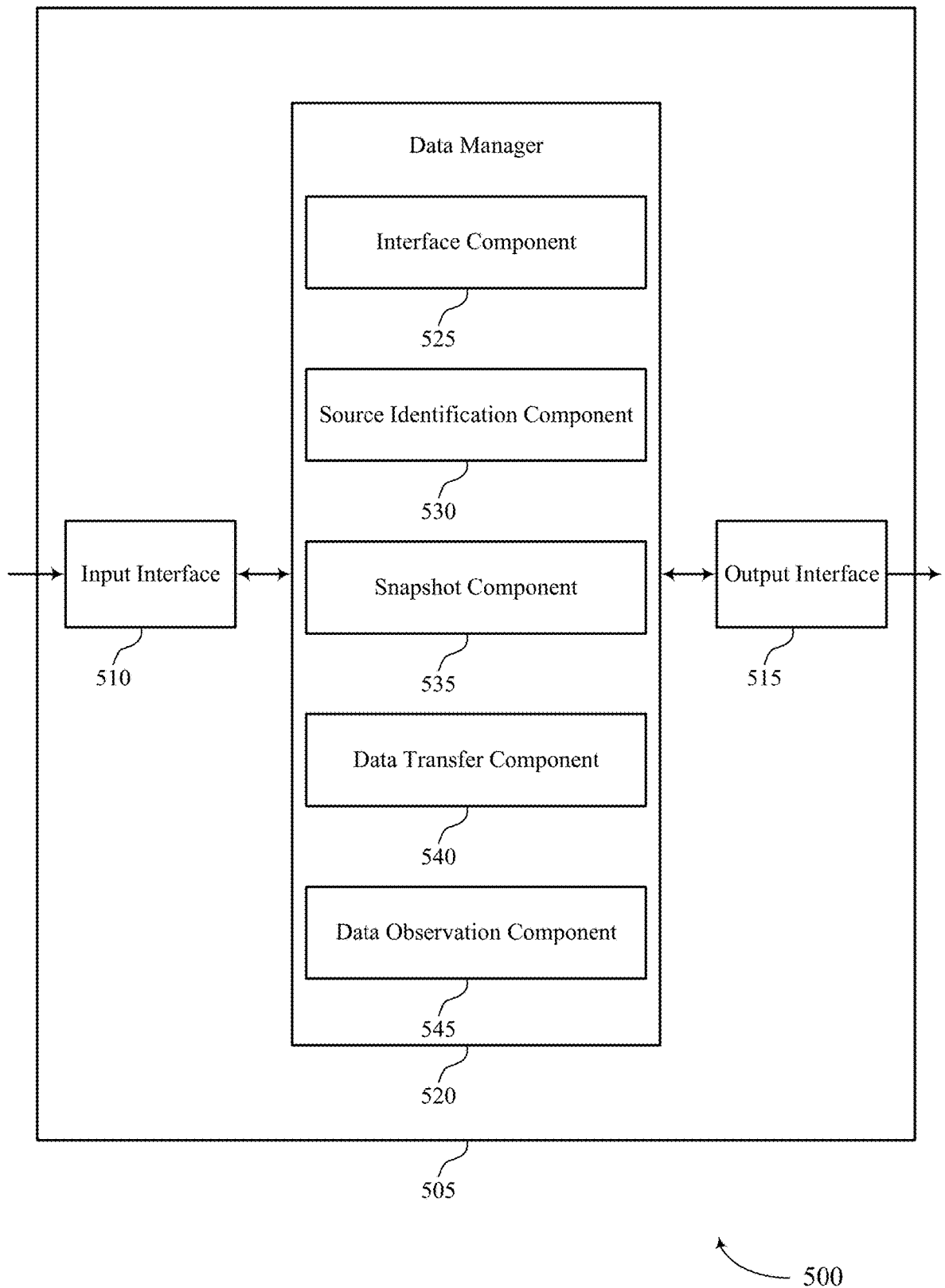
FIG. 5 illustrates a block diagram of an apparatus that supports non-snappable data sources in accordance with aspects of the present disclosure.

FIG. 5 illustrates a block diagram 500 of a system 505 that supports non-snappable data sources in accordance with aspects of the present disclosure. In some examples, the system 505 may be an example of aspects of one or more components described with reference to FIG. 1, such as a DMS 110. The system 505 may include an input interface 510, an output interface 515, and a data manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the data manager 520 to support non-snappable data sources. In some cases, the input interface 510 may be a component of a network interface 725 as described with reference to FIG. 7.

The output interface 515 may manage output signaling for the system 505. For example, the output interface 515 may receive signaling from other components of the system 505, such as the data manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the data manager 520 may include an interface component 525, a source identification component 530, a snapshot component 535, a data transfer component 540, a data observation component 545, or any combination thereof. In some examples, the data manager 520, or various components thereof, may be configured to perform various operations (e.g., receiving, monitoring, transmitting) using or otherwise in cooperation with the input interface 510, the output interface 515, or both. For example, the data manager 520 may receive information from the input interface 510, send information to the output interface 515, or be integrated in combination with the input interface 510, the output interface 515, or both to receive information, transmit information, or perform various other operations as described herein.

The interface component 525 may be configured as or otherwise support a means for receiving, at an interface of a data management system that supports taking snapshots of a first set of data sources, one or more requests to apply one or more data observation procedures to a first data source and to a second data source. The source identification component 530 may be configured as or otherwise support a means for determining, by the data management system, in response to the one or more requests, that snapshots are supported for the first data source based on the first set of data sources including the first data source and that snapshots are unsupported for the second data source based on the first set of data sources excluding the second data source. The snapshot component 535 may be configured as or otherwise support a means for storing, by the data management system, based on snapshots being supported for the first data source, a representation of the first data source at a first data storage as a snapshot. The data transfer component 540 may be configured as or otherwise support a means for initiating, by the data management system, based on snapshots being unsupported for the second data source, a procedure for storing a representation of the second data source at a second data storage having data versioning capabilities. The data observation component 545 may be configured as or otherwise support a means for extracting, by the data management system, first data from the snapshot of the first data source stored at the first data storage and second data from the representation of the second data source stored at the second data storage. The data observation component 545 may be configured as or otherwise support a means for performing, by the data management system, a first data observation procedure of the one or more data observation procedures for the first data extracted from the snapshot and a second data observation procedure of the one or more data observation procedures for the second data extracted from the representation of the second data source. The interface component 525 may be configured as or otherwise support a means for reporting, via the interface, a first result of the first data observation procedure and a second result of the second data observation procedure.

Figure 6:
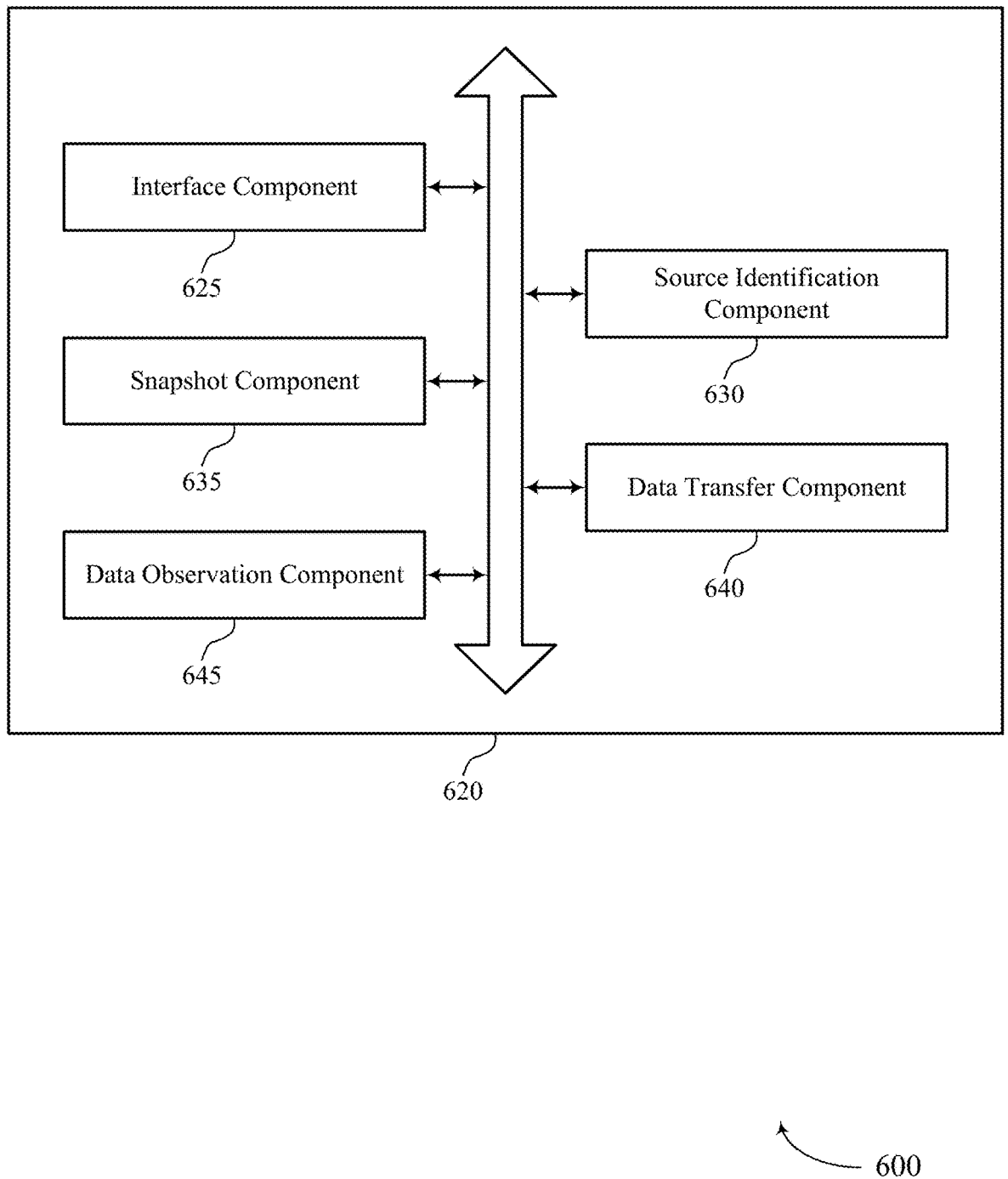
FIG. 6 illustrates a block diagram of a data manager that supports non-snappable data sources in accordance with aspects of the present disclosure.

FIG. 6 illustrates a block diagram 600 of a data manager 620 that supports non-snappable data sources in accordance with aspects of the present disclosure. The data manager 620 may be an example of aspects of a data manager or a data manager 520, or both, as described herein. The data manager 620, or various components thereof, may be an example of means for performing various aspects of supporting non-snappable data sources as described herein. For example, the data manager 620 may include an interface component 625, a source identification component 630, a snapshot component 635, a data transfer component 640, a data observation component 645, or any combination thereof. Each of these components may communicate, directly or indirectly, with one another (e.g., via one or more buses, communications links, communications interfaces, or any combination thereof).

The interface component 625 may be configured as or otherwise support a means for receiving, at an interface of a data management system that supports taking snapshots of a first set of data sources, one or more requests to apply one or more data observation procedures to a first data source and to a second data source. The source identification component 630 may be configured as or otherwise support a means for determining, by the data management system, in response to the one or more requests, that snapshots are supported for the first data source based on the first set of data sources including the first data source and that snapshots are unsupported for the second data source based on the first set of data sources excluding the second data source. The snapshot component 635 may be configured as or otherwise support a means for storing, by the data management system, based on snapshots being supported for the first data source, a representation of the first data source at a first data storage as a snapshot. The data transfer component 640 may be configured as or otherwise support a means for initiating, by the data management system, based on snapshots being unsupported for the second data source, a procedure for storing a representation of the second data source at a second data storage having data versioning capabilities. The data observation component 645 may be configured as or otherwise support a means for extracting, by the data management system, first data from the snapshot of the first data source stored at the first data storage and second data from the representation of the second data source stored at the second data storage. In some examples, the data observation component 645 may be configured as or otherwise support a means for performing, by the data management system, a first data observation procedure of the one or more data observation procedures for the first data extracted from the snapshot and a second data observation procedure of the one or more data observation procedures for the second data extracted from the representation of the second data source. In some examples, the interface component 625 may be configured as or otherwise support a means for reporting, via the interface, a first result of the first data observation procedure and a second result of the second data observation procedure.

In some examples, the interface component 625 may be configured as or otherwise support a means for receiving, at the interface, a third request to apply a data observation procedure to a third data source that includes sensitive information, where the data observation procedure is configured to identify the sensitive information in the third data source. In some examples, the source identification component 630 may be configured as or otherwise support a means for determining, in response to the third request, that snapshots are unsupported for the third data source based on the first set of data sources excluding the third data source. In some examples, the data observation component 645 may be configured as or otherwise support a means for extracting, based on the third data source including the sensitive information, third data from the third data source in a data stream. In some examples, the data observation component 645 may be configured as or otherwise support a means for performing a third data observation procedure for the data stream.

In some examples, the data transfer component 640 may be configured as or otherwise support a means for refraining, after extracting the third data from the third data source, the third data in the second data storage.

In some examples, to support performing the second data observation procedure, the data observation component 645 may be configured as or otherwise support a means for extracting a set of multiple versions of the second data from the second data storage. In some examples, to support performing the second data observation procedure, the data observation component 645 may be configured as or otherwise support a means for analyzing, after extracting the set of multiple versions of the second data, the set of multiple versions of the second data relative to one another. In some examples, to support performing the second data observation procedure, the data observation component 645 may be configured as or otherwise support a means for determining, based on the analyzing, whether one or more anomalies, one or more malware signatures, or both, are identified for the second data.

In some examples, the data transfer component 640 may be configured as or otherwise support a means for storing, a set of multiple representations of the second data source, in the second data storage, the set of multiple representations corresponding to a set of multiple versions of the second data source.

In some examples, the set of multiple versions of the second data source include one or more full versions and one or more incremental versions.

In some examples, the data transfer component 640 may be configured as or otherwise support a means for receiving, after storing the representation of the second data source at the second data storage, a request to restore the second data source to a point-in-time. In some examples, the data transfer component 640 may be configured as or otherwise support a means for initiating, in response to the request to restore the second data source, a procedure for restoring the second data source to the point-in-time using one or more representations of the second data source stored at the second data storage.

In some examples, storing the representation of the second data source at the second data storage includes storing file-system data, metadata, or both, of the second data source at the second data storage. In some examples, the second data extracted from the representation of the second data source includes the file-system data, the metadata or both.

In some examples, the interface component 625 may be configured as or otherwise support a means for receiving, at the interface, a request to back up a computing system that includes a set of multiple data sources that includes the first data source and the second data source. In some examples, the source identification component 630 may be configured as or otherwise support a means for determining that snapshots are supported for first data sources of the set of multiple data sources based on the first set of data sources including the first data sources and that snapshots are unsupported for second data sources of the set of multiple data sources based on the first set of data sources excluding the second data sources. In some examples, the interface component 625 may be configured as or otherwise support a means for sending, via the interface, a message indicating that snapshots are supported for the first data sources and that snapshots are unsupported for the second data sources, where the message further indicates an option for backing up one or more of the second data sources at the second data storage.

In some examples, the interface component 625 may be configured as or otherwise support a means for receiving, at the interface, a request to process a third data source for which snapshots are supported, the request prohibiting snapshots from being taken for the third data source, prohibiting third data of the third data source from being stored, or both. In some examples, the data observation component 645 may be configured as or otherwise support a means for extracting, based on the request prohibiting the third data from being stored, the third data from the third data source in a data stream without storing the third data in the second data storage. In some examples, the data observation component 645 may be configured as or otherwise support a means for performing a third data observation procedure for the data stream.

In some examples, the first data observation procedure and the second data observation procedure are of a same type.

In some examples, the second data source is a cloud-based data source corresponding to a cloud service and the one or more requests includes information for accessing the second data stored using the cloud service.

Figure 7:
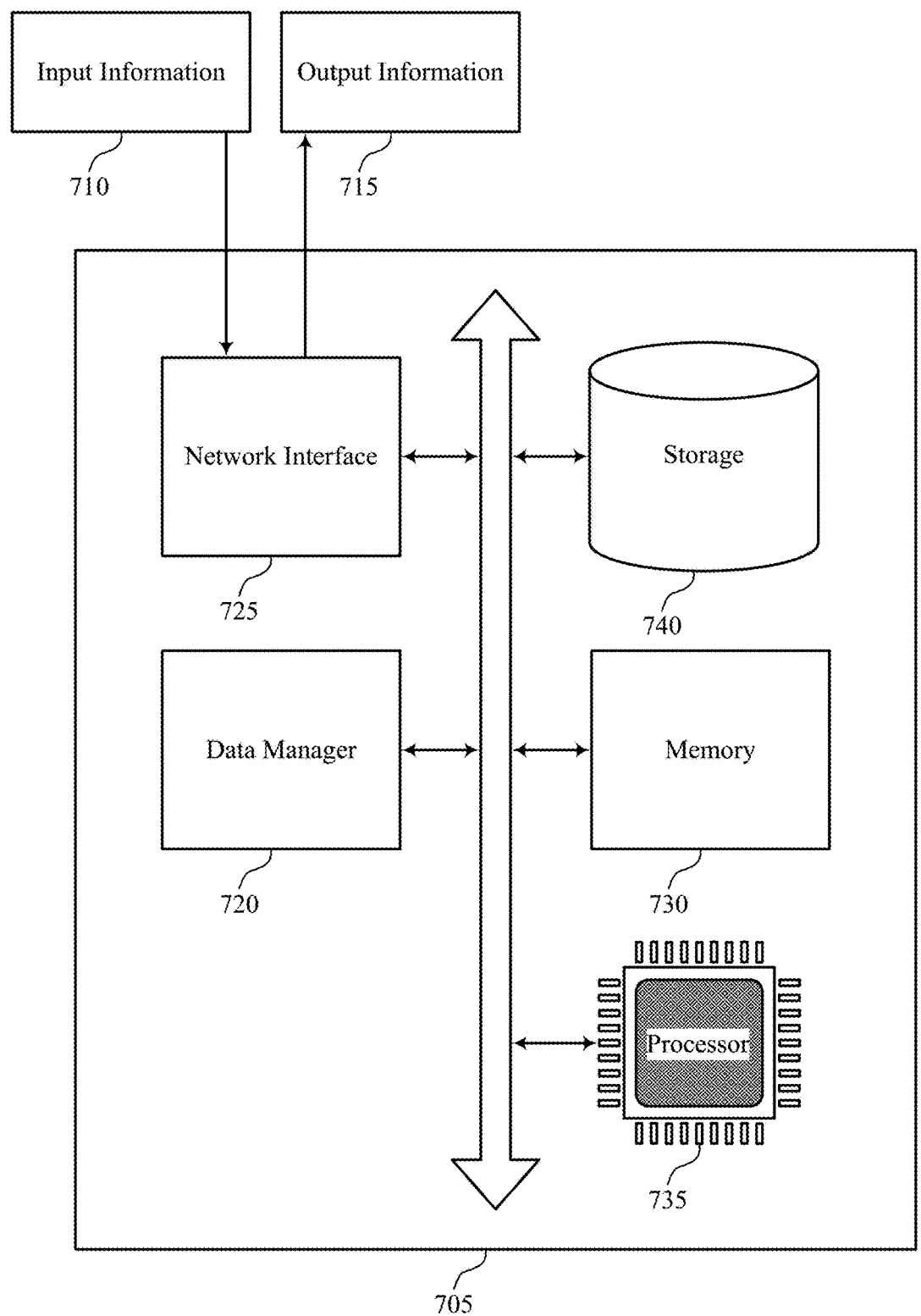
FIG. 7 illustrates a diagram of a system including a device that supports non-snappable data sources in accordance with aspects of the present disclosure.

FIG. 7 illustrates a block diagram 700 of a system 705 that supports non-snappable data sources in accordance with aspects of the present disclosure. The system 705 may be an example of or include the components of a system 505 as described herein. The system 705 may include components for data management, including components such as a data manager 720, a network interface 725, a memory 730, a processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting non-snappable data sources). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the data manager 720 may be configured as or otherwise support a means for receiving, at an interface of a data management system that supports taking snapshots of a first set of data sources, one or more requests to apply one or more data observation procedures to a first data source and to a second data source. The data manager 720 may be configured as or otherwise support a means for determining, by the data management system, in response to the one or more requests, that snapshots are supported for the first data source based on the first set of data sources including the first data source and that snapshots are unsupported for the second data source based on the first set of data sources excluding the second data source. The data manager 720 may be configured as or otherwise support a means for storing, by the data management system, based on snapshots being supported for the first data source, a representation of the first data source at a first data storage as a snapshot. The data manager 720 may be configured as or otherwise support a means for initiating, by the data management system, based on snapshots being unsupported for the second data source, a procedure for storing a representation of the second data source at a second data storage having data versioning capabilities. The data manager 720 may be configured as or otherwise support a means for extracting, by the data management system, first data from the snapshot of the first data source stored at the first data storage and second data from the representation of the second data source stored at the second data storage. The data manager 720 may be configured as or otherwise support a means for performing, by the data management system, a first data observation procedure of the one or more data observation procedures for the first data extracted from the snapshot and a second data observation procedure of the one or more data observation procedures for the second data extracted from the representation of the second data source. The data manager 720 may be configured as or otherwise support a means for reporting, via the interface, a first result of the first data observation procedure and a second result of the second data observation procedure.

By including or configuring the data manager 720 in accordance with examples as described herein, the system 705 may support techniques for supporting non-snappable data sources, which may provide one or more benefits such as, for example, extending data protection and data observability services to non-snappable data sources, among other possibilities.

Figure 8:
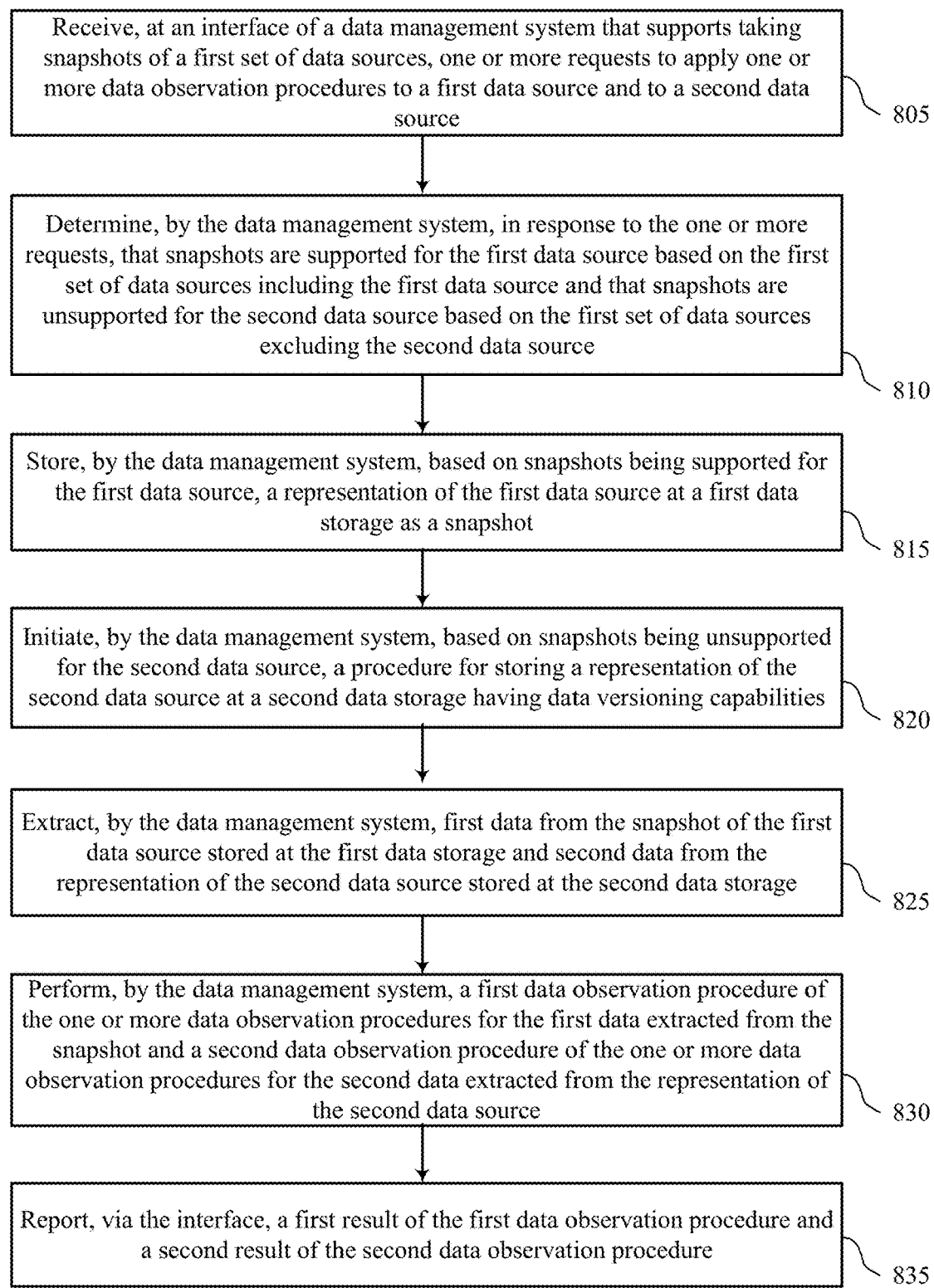
FIG. 8 illustrates a flowchart showing methods that support non-snappable data sources in accordance with aspects of the present disclosure.

FIG. 8 illustrates a flowchart showing a method 800 that supports non-snappable data sources in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include receiving, at an interface of a data management system that supports taking snapshots of a first set of data sources, one or more requests to apply one or more data observation procedures to a first data source and to a second data source. The operations of 805 may be performed in accordance with examples as disclosed herein. In some examples, aspects of the operations of 805 may be performed by an interface component 625 as described with reference to FIG. 6.

At 810, the method may include determining, by the data management system, in response to the one or more requests, that snapshots are supported for the first data source based on the first set of data sources including the first data source and that snapshots are unsupported for the second data source based on the first set of data sources excluding the second data source. The operations of 810 may be performed in accordance with examples as disclosed herein. In some examples, aspects of the operations of 810 may be performed by a source identification component 630 as described with reference to FIG. 6.

At 815, the method may include storing, by the data management system, based on snapshots being supported for the first data source, a representation of the first data source at a first data storage as a snapshot. The operations of 815 may be performed in accordance with examples as disclosed herein. In some examples, aspects of the operations of 815 may be performed by a snapshot component 635 as described with reference to FIG. 6.

At 820, the method may include initiating, by the data management system, based on snapshots being unsupported for the second data source, a procedure for storing a representation of the second data source at a second data storage having data versioning capabilities. The operations of 820 may be performed in accordance with examples as disclosed herein. In some examples, aspects of the operations of 820 may be performed by a data transfer component 640 as described with reference to FIG. 6.

At 825, the method may include extracting, by the data management system, first data from the snapshot of the first data source stored at the first data storage and second data from the representation of the second data source stored at the second data storage. The operations of 825 may be performed in accordance with examples as disclosed herein. In some examples, aspects of the operations of 825 may be performed by a data observation component 645 as described with reference to FIG. 6.

At 830, the method may include performing, by the data management system, a first data observation procedure of the one or more data observation procedures for the first data extracted from the snapshot and a second data observation procedure of the one or more data observation procedures for the second data extracted from the representation of the second data source. The operations of 830 may be performed in accordance with examples as disclosed herein. In some examples, aspects of the operations of 830 may be performed by a data observation component 645 as described with reference to FIG. 6.

At 835, the method may include reporting, via the interface, a first result of the first data observation procedure and a second result of the second data observation procedure. The operations of 835 may be performed in accordance with examples as disclosed herein. In some examples, aspects of the operations of 835 may be performed by an interface component 625 as described with reference to FIG. 6.

A method is described. The method may include receiving, at an interface of a data management system that supports taking snapshots of a first set of data sources, one or more requests to apply one or more data observation procedures to a first data source and to a second data source, determining, by the data management system, in response to the one or more requests, that snapshots are supported for the first data source based on the first set of data sources including the first data source and that snapshots are unsupported for the second data source based on the first set of data sources excluding the second data source, storing, by the data management system, based on snapshots being supported for the first data source, a representation of the first data source at a first data storage as a snapshot, initiating, by the data management system, based on snapshots being unsupported for the second data source, a procedure for storing a representation of the second data source at a second data storage having data versioning capabilities, extracting, by the data management system, first data from the snapshot of the first data source stored at the first data storage and second data from the representation of the second data source stored at the second data storage, performing, by the data management system, a first data observation procedure of the one or more data observation procedures for the first data extracted from the snapshot and a second data observation procedure of the one or more data observation procedures for the second data extracted from the representation of the second data source, and reporting, via the interface, a first result of the first data observation procedure and a second result of the second data observation procedure.

An apparatus is described. The apparatus may include a processor, memory coupled with the processor, and instructions stored in the memory. The instructions may be executable by the processor to cause the apparatus to receive, at an interface of a data management system that supports taking snapshots of a first set of data sources, one or more requests to apply one or more data observation procedures to a first data source and to a second data source, determine, by the data management system, in response to the one or more requests, that snapshots are supported for the first data source based on the first set of data sources including the first data source and that snapshots are unsupported for the second data source based on the first set of data sources excluding the second data source, store, by the data management system, based on snapshots being supported for the first data source, a representation of the first data source at a first data storage as a snapshot, initiate, by the data management system, based on snapshots being unsupported for the second data source, a procedure for storing a representation of the second data source at a second data storage having data versioning capabilities, extract, by the data management system, first data from the snapshot of the first data source stored at the first data storage and second data from the representation of the second data source stored at the second data storage, perform, by the data management system, a first data observation procedure of the one or more data observation procedures for the first data extracted from the snapshot and a second data observation procedure of the one or more data observation procedures for the second data extracted from the representation of the second data source, and reporting, via the interface, a first result of the first data observation procedure and a second result of the second data observation procedure.

Another apparatus is described. The apparatus may include means for receiving, at an interface of a data management system that supports taking snapshots of a first set of data sources, one or more requests to apply one or more data observation procedures to a first data source and to a second data source, means for determining, by the data management system, in response to the one or more requests, that snapshots are supported for the first data source based on the first set of data sources including the first data source and that snapshots are unsupported for the second data source based on the first set of data sources excluding the second data source, means for storing, by the data management system, based on snapshots being supported for the first data source, a representation of the first data source at a first data storage as a snapshot, means for initiating, by the data management system, based on snapshots being unsupported for the second data source, a procedure for storing a representation of the second data source at a second data storage having data versioning capabilities, means for extracting, by the data management system, first data from the snapshot of the first data source stored at the first data storage and second data from the representation of the second data source stored at the second data storage, means for performing, by the data management system, a first data observation procedure of the one or more data observation procedures for the first data extracted from the snapshot and a second data observation procedure of the one or more data observation procedures for the second data extracted from the representation of the second data source, and means for reporting, via the interface, a first result of the first data observation procedure and a second result of the second data observation procedure.

A non-transitory computer-readable medium storing code is described. The code may include instructions executable by a processor to receive, at an interface of a data management system that supports taking snapshots of a first set of data sources, one or more requests to apply one or more data observation procedures to a first data source and to a second data source, determine, by the data management system, in response to the one or more requests, that snapshots are supported for the first data source based on the first set of data sources including the first data source and that snapshots are unsupported for the second data source based on the first set of data sources excluding the second data source, store, by the data management system, based on snapshots being supported for the first data source, a representation of the first data source at a first data storage as a snapshot, initiate, by the data management system, based on snapshots being unsupported for the second data source, a procedure for storing a representation of the second data source at a second data storage having data versioning capabilities, extract, by the data management system, first data from the snapshot of the first data source stored at the first data storage and second data from the representation of the second data source stored at the second data storage, perform, by the data management system, a first data observation procedure of the one or more data observation procedures for the first data extracted from the snapshot and a second data observation procedure of the one or more data observation procedures for the second data extracted from the representation of the second data source, and reporting, via the interface, a first result of the first data observation procedure and a second result of the second data observation procedure.

Some examples of the method, apparatuses, and non-transitory computer-readable medium described herein may further include operations, features, means, or instructions for receiving, at the interface, a third request to apply a data observation procedure to a third data source that includes sensitive information, where the data observation procedure may be configured to identify the sensitive information in the third data source, determining, in response to the third request, that snapshots may be unsupported for the third data source based on the first set of data sources excluding the third data source, extracting, based on the third data source including the sensitive information, third data from the third data source in a data stream, and performing a third data observation procedure for the data stream.

Some examples of the method, apparatuses, and non-transitory computer-readable medium described herein may further include operations, features, means, or instructions for refraining, after extracting the third data from the third data source, the third data in the second data storage.

In some examples of the method, apparatuses, and non-transitory computer-readable medium described herein, the second data observation procedure may be a procedure for identifying threats in the second data, and performing the second data observation procedure may include operations, features, means, or instructions for extracting a set of multiple versions of the second data from the second data storage, analyzing, after extracting the set of multiple versions of the second data, the set of multiple versions of the second data relative to one another, and determining, based on the analyzing, whether one or more anomalies, one or more malware signatures, or both, may be identified for the second data.

Some examples of the method, apparatuses, and non-transitory computer-readable medium described herein may further include operations, features, means, or instructions for storing, a set of multiple representations of the second data source, in the second data storage, the set of multiple representations corresponding to a set of multiple versions of the second data source.

In some examples of the method, apparatuses, and non-transitory computer-readable medium described herein, the set of multiple versions of the second data source include one or more full versions and one or more incremental versions.

Some examples of the method, apparatuses, and non-transitory computer-readable medium described herein may further include operations, features, means, or instructions for receiving, after storing the representation of the second data source at the second data storage, a request to restore the second data source to a point-in-time and initiating, in response to the request to restore the second data source, a procedure for restoring the second data source to the point-in-time using one or more representations of the second data source stored at the second data storage.

Some examples of the method, apparatuses, and non-transitory computer-readable medium described herein may further include operations, features, means, or instructions for storing the representation of the second data source at the second data storage includes storing file-system data, metadata, or both, of the second data source at the second data storage and the second data extracted from the representation of the second data source includes the file-system data, the metadata or both.

Some examples of the method, apparatuses, and non-transitory computer-readable medium described herein may further include operations, features, means, or instructions for receiving, at the interface, a request to back up a computing system that includes a set of multiple data sources that includes the first data source and the second data source, determining that snapshots may be supported for first data sources of the set of multiple data sources based on the first set of data sources including the first data sources and that snapshots may be unsupported for second data sources of the set of multiple data sources based on the first set of data sources excluding the second data sources, and sending, via the interface, a message indicating that snapshots may be supported for the first data sources and that snapshots may be unsupported for the second data sources, where the message further indicates an option for backing up one or more of the second data sources at the second data storage.

Some examples of the method, apparatuses, and non-transitory computer-readable medium described herein may further include operations, features, means, or instructions for receiving, at the interface, a request to process a third data source for which snapshots may be supported, the request prohibiting snapshots from being taken for the third data source, prohibiting third data of the third data source from being stored, or both, extracting, based on the request prohibiting the third data from being stored, the third data from the third data source in a data stream without storing the third data in the second data storage, and performing a third data observation procedure for the data stream.

In some examples of the method, apparatuses, and non-transitory computer-readable medium described herein, the first data observation procedure and the second data observation procedure may be of a same type.

In some examples of the method, apparatuses, and non-transitory computer-readable medium described herein, the second data source may be a cloud-based data source corresponding to a cloud service and the one or more requests includes information for accessing the second data stored using the cloud service.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving, at an interface of a data management system that supports taking snapshots of a first set of data sources, one or more requests to apply one or more data observation procedures to a first data source and to a second data source;
   determining, by the data management system, in response to the one or more requests, that snapshots are supported for the first data source based at least in part on the first set of data sources including the first data source and that snapshots are unsupported for the second data source based at least in part on the first set of data sources excluding the second data source;
   storing, by the data management system, based at least in part on snapshots being supported for the first data source, a representation of the first data source at a first data storage as a snapshot;
   initiating, by the data management system, based at least in part on snapshots being unsupported for the second data source, a procedure for storing a representation of the second data source at a second data storage having data versioning capabilities;
   extracting, by the data management system, first data from the snapshot of the first data source stored at the first data storage and second data from the representation of the second data source stored at the second data storage;
   performing, by the data management system, a first data observation procedure of the one or more data observation procedures for the first data extracted from the snapshot and a second data observation procedure of the one or more data observation procedures for the second data extracted from the representation of the second data source; and
   reporting, via the interface, a first result of the first data observation procedure and a second result of the second data observation procedure.

2. The method of claim 1, further comprising:
   receiving, at the interface, a third request to apply a data observation procedure to a third data source that comprises sensitive information, wherein the data observation procedure is configured to identify the sensitive information in the third data source;
   determining, in response to the third request, that snapshots are unsupported for the third data source based on the first set of data sources excluding the third data source;
   extracting, based at least in part on the third data source comprising the sensitive information, third data from the third data source in a data stream; and
   performing a third data observation procedure for the data stream.

3. The method of claim 2, further comprising:
   refraining, after extracting the third data from the third data source, the third data in the second data storage.

4. The method of claim 1, wherein the second data observation procedure is a procedure for identifying threats in the second data, and wherein performing the second data observation procedure further comprises:
   extracting a plurality of versions of the second data from the second data storage;
   analyzing, after extracting the plurality of versions of the second data, the plurality of versions of the second data relative to one another; and determining, based at least in part on the analyzing, whether one or more anomalies, one or more malware signatures, or both, are identified for the second data.

5. The method of claim 1, further comprising:
storing, a plurality of representations of the second data source, in the second data storage, the plurality of representations corresponding to a plurality of versions of the second data source.

6. The method of claim 5, wherein the plurality of versions of the second data source comprise one or more full versions and one or more incremental versions.

7. The method of claim 1, further comprising:
receiving, after storing the representation of the second data source at the second data storage, a request to restore the second data source to a point-in-time; and
initiating, in response to the request to restore the second data source, a procedure for restoring the second data source to the point-in-time using one or more representations of the second data source stored at the second data storage.

8. The method of claim 1, wherein storing the representation of the second data source at the second data storage comprises:
storing file-system data, metadata, or both, of the second data source at the second data storage, wherein the second data extracted from the representation of the second data source comprises the file-system data, the metadata or both.

9. The method of claim 1, further comprising:
receiving, at the interface, a request to back up a computing system that comprises a plurality of data sources that includes the first data source and the second data source;
determining that snapshots are supported for first data sources of the plurality of data sources based at least in part on the first set of data sources including the first data sources and that snapshots are unsupported for second data sources of the plurality of data sources based at least in part on the first set of data sources excluding the second data sources; and
sending, via the interface, a message indicating that snapshots are supported for the first data sources and that snapshots are unsupported for the second data sources, wherein the message further indicates an option for backing up one or more of the second data sources at the second data storage.

10. The method of claim 1, further comprising:
receiving, at the interface, a request to process a third data source for which snapshots are supported, the request prohibiting snapshots from being taken for the third data source, prohibiting third data of the third data source from being stored, or both;
extracting, based at least in part on the request prohibiting the third data from being stored, the third data from the third data source in a data stream without storing the third data in the second data storage; and
performing a third data observation procedure for the data stream.

11. The method of claim 1, wherein the first data observation procedure and the second data observation procedure are of a same type.

12. The method of claim 1, wherein:
the second data source is a cloud-based data source corresponding to a cloud service, and
the one or more requests comprises information for accessing the second data stored using the cloud service.

13. An apparatus, comprising:
a processor; and
memory coupled with the processor, the memory storing instructions executable by the processor to cause the apparatus to:
receive, at an interface of a data management system that supports taking snapshots of a first set of data sources, one or more requests to apply one or more data observation procedures to a first data source and to a second data source;
determine, by the data management system, in response to the one or more requests, that snapshots are supported for the first data source based at least in part on the first set of data sources including the first data source and that snapshots are unsupported for the second data source based at least in part on the first set of data sources excluding the second data source;
store, by the data management system, based at least in part on snapshots being supported for the first data source, a representation of the first data source at a first data storage as a snapshot;
initiate, by the data management system, based at least in part on snapshots being unsupported for the second data source, a procedure for storing a representation of the second data source at a second data storage having data versioning capabilities;
extract, by the data management system, first data from the snapshot of the first data source stored at the first data storage and second data from the representation of the second data source stored at the second data storage;
perform, by the data management system, a first data observation procedure of the one or more data observation procedures for the first data extracted from the snapshot and a second data observation procedure of the one or more data observation procedures for the second data extracted from the representation of the second data source; and
report, via the interface, a first result of the first data observation procedure and a second result of the second data observation procedure.

14. The apparatus of claim 13, wherein the instructions are further executable by the processor to cause the apparatus to:
receive, at the interface, a third request to apply a data observation procedure to a third data source that comprises sensitive information, wherein the data observation procedure is configured to identify the sensitive information in the third data source;
determine, in response to the third request, that snapshots are unsupported for the third data source based on the first set of data sources excluding the third data source;
extract, based at least in part on the third data source comprising the sensitive information, third data from the third data source in a data stream; and
perform a third data observation procedure for the data stream.

15. The apparatus of claim 13, wherein the instructions are further executable by the processor to cause the apparatus to:
store, a plurality of representations of the second data source, in the second data storage, the plurality of representations corresponding to a plurality of versions of the second data source.

16. The apparatus of claim 13, wherein the instructions are further executable by the processor to cause the apparatus to:
  receive, after storing the representation of the second data source at the second data storage, a request to restore the second data source to a point-in-time; and
  initiate, in response to the request to restore the second data source, a procedure for restoring the second data source to the point-in-time using one or more representations of the second data source stored at the second data storage.

17. The apparatus of claim 13, wherein the instructions are further executable by the processor to cause the apparatus to:
  receive, at the interface, a request to back up a computing system that comprises a plurality of data sources that includes the first data source and the second data source;
  determine that snapshots are supported for first data sources of the plurality of data sources based at least in part on the first set of data sources including the first data sources and that snapshots are unsupported for second data sources of the plurality of data sources based at least in part on the first set of data sources excluding the second data sources; and
  send, via the interface, a message indicating that snapshots are supported for the first data sources and that snapshots are unsupported for the second data sources, wherein the message further indicates an option for backing up one or more of the second data sources at the second data storage.

18. The apparatus of claim 13, wherein the instructions are further executable by the processor to cause the apparatus to:
  receive, at the interface, a request to process a third data source for which snapshots are supported, the request prohibiting snapshots from being taken for the third data source, prohibiting third data of the third data source from being stored, or both;
  extract, based at least in part on the request prohibiting the third data from being stored, the third data from the third data source in a data stream without storing the third data in the second data storage; and
  perform a third data observation procedure for the data stream.

19. A non-transitory, computer-readable medium storing code comprising instructions executable by a processor of an electronic device to cause the electronic device to:
  receive, at an interface of a data management system that supports taking snapshots of a first set of data sources, one or more requests to apply one or more data observation procedures to a first data source and to a second data source;
  determine, by the data management system, in response to the one or more requests, that snapshots are supported for the first data source based at least in part on the first set of data sources including the first data source and that snapshots are unsupported for the second data source based at least in part on the first set of data sources excluding the second data source;
  store, by the data management system, based at least in part on snapshots being supported for the first data source, a representation of the first data source at a first data storage as a snapshot;
  initiate, by the data management system, based at least in part on snapshots being unsupported for the second data source, a procedure for storing a representation of the second data source at a second data storage having data versioning capabilities;
  extract, by the data management system, first data from the snapshot of the first data source stored at the first data storage and second data from the representation of the second data source stored at the second data storage;
  perform, by the data management system, a first data observation procedure of the one or more data observation procedures for the first data extracted from the snapshot and a second data observation procedure of the one or more data observation procedures for the second data extracted from the representation of the second data source; and
  report, via the interface, a first result of the first data observation procedure and a second result of the second data observation procedure.

20. The non-transitory, computer-readable medium of claim 19, wherein the instructions are further executable by the processor to cause the electronic device to:
  receive, at the interface, a third request to apply a data observation procedure to a third data source that comprises sensitive information, wherein the data observation procedure is configured to identify the sensitive information in the third data source;
  determine, in response to the third request, that snapshots are unsupported for the third data source based on the first set of data sources excluding the third data source;
  extract, based at least in part on the third data source comprising the sensitive information, third data from the third data source in a data stream; and
  perform a third data observation procedure for the data stream.

* * * * *